Figure 1:
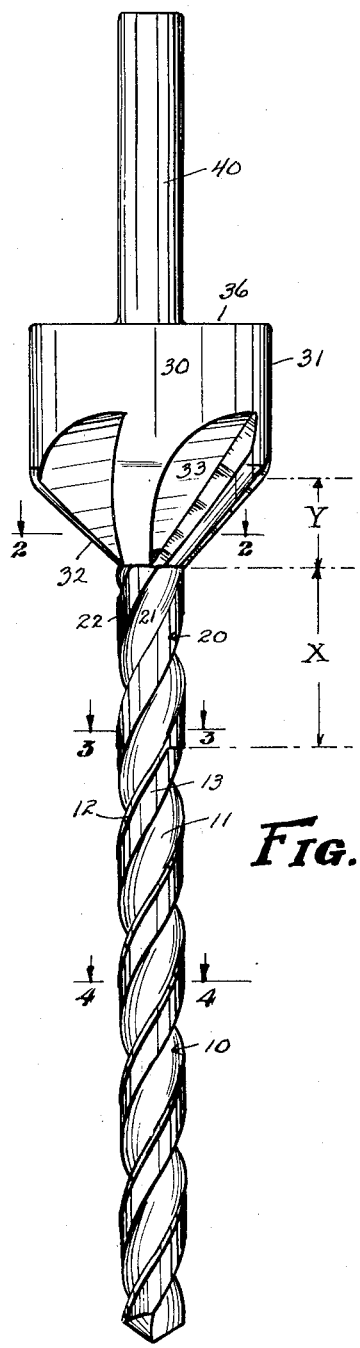

Nov. 7, 1944.   H. I. FOSTER   2,362,260
COUNTERSINKING DRILL
Filed Dec. 8, 1943

INVENTOR.
HARRY I. FOSTER
BY
Albert H. Bates,
ATTORNEY

Patented Nov. 7, 1944

2,362,260

UNITED STATES PATENT OFFICE 2,362,260

COUNTERSINKING DRILL

Harry I. Foster, Maple Heights, Ohio

Application December 8, 1943, Serial No. 513,386

6 Claims. (Cl. 77—66)

This invention relates to a drilling and countersinking tool which at one continuous operation may drill a cylindrical hole and countersink a conical approach thereto. The primary object of the invention is to so form such tool that the countersinking conical recess shall be axially aligned with the drilled hole with the accuracy necessary for precision work. Another object of the invention is to make the device self-clearing so that the chips cut out shall be automatically discharged and not cause any binding or interference with the accurate action of the tool. Other features of the invention will be more apparent from the following detailed description of the preferred embodiment illustrated in the drawing.

In ordinary operations drilling and countersinking comprise independent operations and there is considerable liability of the countersunk cone not accurately aligning with the drilled hole. My tool which makes the countersinking member as a rigid portion mounted on the shank of the drill proper and avoids this difficulty.

In accomplishing the desired result, I provide, in a single tool, a drilling portion having a cutting edge; then above this a collar portion fluted as a continuation of the drill fluting and having an external diameter the same as the cutting diameter of the drill, and, above this collar portion, a countersinking member.

Figure 2:
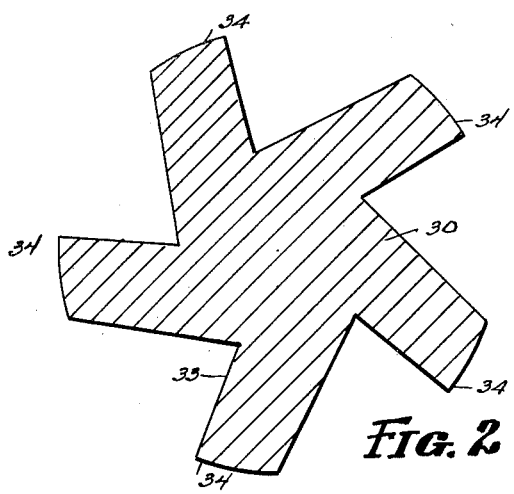
Figure 3:
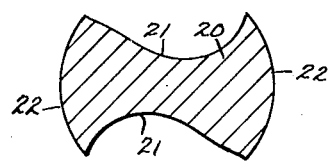
Figure 4:
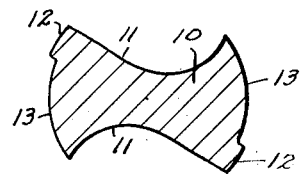

In the drawing, Fig. 1 is a side elevation of a countersinking drill embodying my invention; Figs. 2, 3 and 4 are enlarged cross sections all on the same scale with each other on the correspondingly numbered lines on Fig. 1.

As shown in Figs. 1 and 4 of the drawing, 10 indicates the drilling portion of the tool having the usual diametrically opposed twisted fluttings 11 and having diametrically opposed twisted cutting edges 12 with the relieved portion 13 back of the cutting edge, this being the usual construction of a drill.

At the upper end of the drill proper, I provide the collar portion 20 (Figs. 1 and 3) which has the same flutings 21 as in the drilling portion and has an external cylindrical guiding portion 22 which is of the same diameter as the cutting portion 12 of the drill proper.

Above the collar portion I provide the countersinking member 30, Figs. 1 and 2. This member is cylindrical in its upper portion, as indicated at 31 and conical in the lower portion at 32, the exterior of the cone leading inwardly from the cylindrical portion to the top of the collar portion 20. A series of flutings 33 are made in the conical portion and preferably extend up into the cylindrical portion. This leaves cutting edges 34 effective to cut away the upper portion of the drilled hole to provide the conical countersinking. The top of the countersinking member 36 is made flat and at right angles to the axis.

Above the countersinking portion is the shank 40 by which the drill may be chucked in a suitable driving device.

By giving the collar portion a cylindrical exterior of considerable area, and of a diameter the same as the cutting edge of the drill proper, I form the effective guide desired for the countersinker. While by continuing the fluting recess 11 upwardly across the collar as indicated at 21, I enable the ready discharge of the chips cut out by the drill without at all interfering with the guiding action of the collar.

When the drill portion is of a normal length, I find it most satisfactory to make the collar portion about twice the length of the countersinking portion, as indicated by the relative dimensions X on Fig. 1 for the collar portion and Y for the conical portion of the countersinker. I find that such relative length is advantageous in insuring the collar portion will be effective in guiding the countersinker with the extreme accuracy desired. However, if the drill is unusually short, the length of the collar relative to the countersinker may be reduced.

It will be noticed that the top of the countersinker is made at right angles to the axis of the tool, so that such top is parallel with the face of the material being drilled and countersunk and thus furnishes means for quickly sighting the correct angle of approach of the drill.

The drawing illustrates the countersinking member as made integral with the unitary tool, but, if desired for simplicity of manufacture, it may be a separate member snugly surrounding the shank and rigidly secured thereto.

I claim:

1. A combined drilling and countersinking tool comprising a drilling portion having helical cutting edges separated by helical flutings, a collar portion having helical guiding surfaces which form parts of a cylinder of the same diameter as the cutting edges of the drilling portion, the collar portion having helical flutings continuing those of the drilling portion, and a countersinking device above the collar portion on the same axis as the collar and drilling portions.

2. A combined drilling and countersinking tool comprising a drilling portion having diametrically opposed helical cutting edges separated by helical flutings, a collar portion having diametrically opposed helical non-cutting guiding surfaces which form parts of a cylinder of the same diameter as the cutting edges of the drilling portion, the collar portion having helical flutings continuing those of the drilling portion, and a countersinking device above the collar portion and rigid therewith and having a fluted conical portion the lower edge of which joins the cylindrical surface of the collar portion.

3. A tool of the character described having a drilling portion with helical cutting edges and relieved surfaces back of the edges and helical flutings, a collar portion axially aligned with the drilling portion and having the same flutings, and having a non-cutting guiding portion of the same arcuate extent as the cutting and relief portions of the drill proper, the surface of the guiding portion being cylindrical and of the same diameter as the cutting edge of the drill, a countersinking body at the other end of the collar portion and a shank above the countersinking body.

4. A tool of the character described having a drilling portion with helical cutting edges and helical flutings, a collar portion axially aligned with the drilling portion and having a cylindrical non-cutting guiding surface which is of the same diameter as the cutting portion of the drill and having flutings communicating with those of the drill, and a conical countersinking portion at the other end of the collar portion, the axial length of the collar portion being substantially twice that of the axial length of the conical countersinking portion.

5. A unitary tool for drilling and countersinking comprising a drilling portion, a non-cutting collar portion above the drilling portion and a countersinking portion above the collar portion, the collar portion having the same external diameter as the cutting edge of the drilling portion, and having clearance passageways communicating with the chip space of the drill.

6. The combination in a single tool of a cutting fluted drill, a non-cutting fluted bearing above the drill adapted to seat snugly in the hole drilled and a cutting countersinker above the bearing all on the same axis.

HARRY I. FOSTER.